United States Patent [19]

Erickson

[11] Patent Number: 4,688,657

[45] Date of Patent: Aug. 25, 1987

[54] PORTABLE ELEVATING DEVICE

[76] Inventor: Leonard R. Erickson, 482 James St., Hutchinson, Minn. 55350

[21] Appl. No.: 783,334

[22] Filed: Oct. 3, 1985

Related U.S. Application Data

[63] Continuation of Ser. No. 563,689, Dec. 20, 1983, abandoned.

[51] Int. Cl.$^4$ .............................................. E04G 3/10
[52] U.S. Cl. .................................. 182/142; 182/187; 182/7; 182/206; 182/133
[58] Field of Search ...................... 182/142, 187, 5-7, 182/145, 188, 133, 206, 63

[56] References Cited

U.S. PATENT DOCUMENTS

| | | |
|---|---|---|
| 272,129 | 2/1883 | Edmons .................................. 182/7 |
| 305,100 | 3/1884 | Moore . |
| 1,574,529 | 4/1926 | Abraham . |
| 1,971,294 | 9/1934 | Bunker . |
| 2,254,179 | 9/1941 | Hoyt . |
| 2,829,702 | 12/1958 | Keating . |
| 2,847,059 | 3/1958 | Klins . |
| 2,851,085 | 2/1958 | Woodward . |
| 3,460,649 | 8/1969 | Baker et al. . |
| 3,568,797 | 3/1971 | Hardy ................................. 182/187 |
| 3,727,723 | 4/1973 | Pitcairn et al. . |
| 3,731,762 | 1/1971 | Sirls . |
| 3,856,111 | 12/1974 | Baker . |
| 3,871,482 | 3/1975 | Southard . |
| 3,944,022 | 3/1976 | Ming . |
| 3,955,645 | 5/1976 | Dye . |
| 3,960,240 | 6/1976 | Cotton . |
| 4,103,758 | 2/1978 | Himmelrich . |
| 4,205,733 | 6/1980 | Wade ................................. 182/142 |
| 4,347,914 | 7/1982 | Gary . |
| 4,428,455 | 1/1984 | Dale ...................................... 182/7 |

OTHER PUBLICATIONS

1983 Catalog of Baker Manufacturing Co., 428 North St., Augustine Rd., Valdosta, Ga. 31601.
Catalog sheet of Welding Shop Ltd., 108 Clinton St., LaCrosse, Wis. 54601.

"Attn: Deerhunters", advertisement of R.A.B. Enterprises, P.O., Box 70171, St. Paul, Minn. 55107.
"Portable Hunter's Stand", advertisement of Hunters Equipment Mfg. Co., Inc., P.O. Box 5654, Rte. 8, Box 183, San Angelo, Tex. 76902.

(List continued on next page.)

Primary Examiner—Reinaldo P. Machado
Assistant Examiner—Alvin Chin-Shue
Attorney, Agent, or Firm—Peterson, Wicks, Nemer & Kamrath

[57] ABSTRACT

A portable elevating device constructed according to the preferred embodiment of the present invention is shown as including a winch frame for mounting a winch and a harness assembly secured to the winch frame for supporting an operator. In the preferred embodiment, the free end of the cable of the winch is releasably secured at a vertical position by a C-shaped anchor. The anchor may be positioned at the vertical position by a telescoping pole releasably secured thereto. After the free end of the cable is secured to the vertical position, the operator located in the harness assembly can elevate or lower himself by rolling or unrolling the cable on the winch. The winch frame in its most preferred form includes a rope gripping member for gripping a rope secured to a vertical position and moveable between a non-engaging position and an engaging position to thus operate as a safety line if the winch, cable, or anchor should fail. In its most preferred embodiment, the winch includes a member for stopping rotation of the winch if it reaches a rotational speed limit. In its most preferred embodiment, the winch stopping member includes pivotally mounted members which are rotatable with the winch and have an increasing radial extent with increasing rotational speed due to centrifugal forces. The components of the elevating device can be collapsed and interconnected as a single unit into a transport mode for carrying on the back of the operator.

2 Claims, 6 Drawing Figures

OTHER PUBLICATIONS

"Hunters The Only Deer Stand For You49", advertisement of C. E. Blackwell, Hiway 35-S at Solmes Exit (942 Allen St.), New Braunfels, Tex.

"The Spartan", advertisement of Channelview Archery, Department ATH, P.O. Drawer Q, Channelview, Tex. 77530.

"Real Trailers", advertisement of Real Trailers, 8874 Culebra, San Antonio, Tex. 78251.

"Texas Hunter", advertisement of Braden Wire & Metal Products, 1310 West Laurel St., P.O. Box 5087, San Antonio, Tex. 78201.

"Pack-A-Stand", advertisement of Pack-A-Stand Mfg., Co., Inc., 14920 Butternut St. N.W., Anoka, Minn. 55303.

"These Features Make Bucksy The Most Stable Portable Tree Stand Made", advertisement Safariland Hunting Corp., P.O. Box N.N., McLean, Va. 22101.

"Loc-On", advertisement of Loc-On company, P.O. Box 11, Summerfield, N.C. 27358.

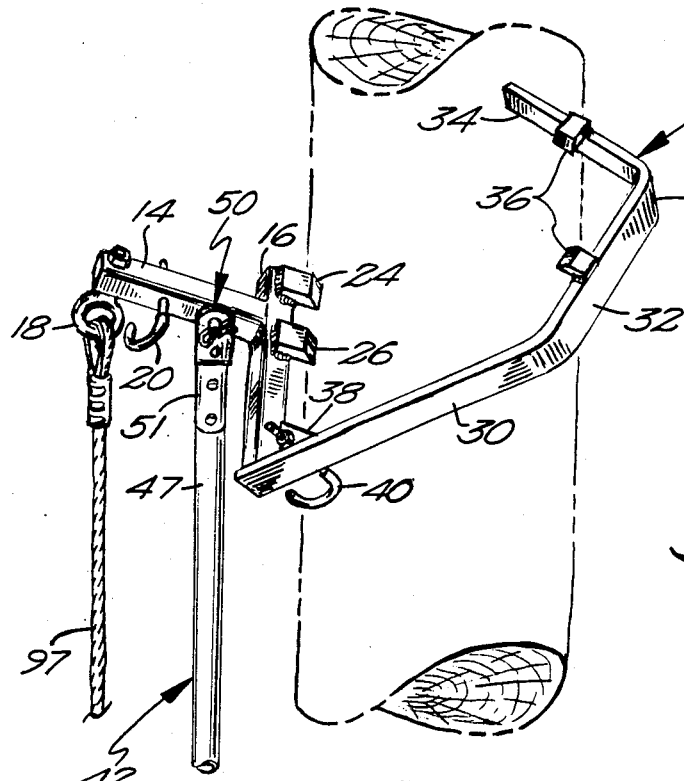
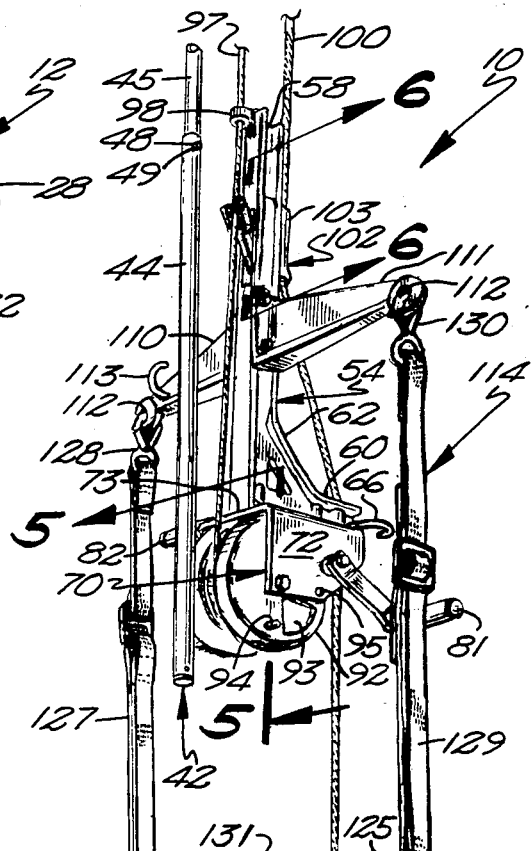
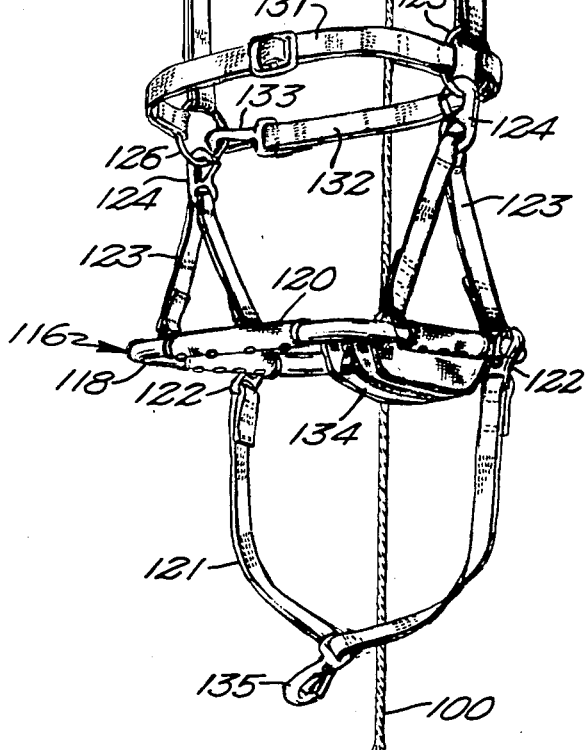

4,688,657

PORTABLE ELEVATING DEVICE

This is a continuation of co-pending application Ser. No. 563,689 filed on Dec. 20, 1983, now abandoned.

BACKGROUND

The present invention relates generally to elevating devices and more particularly to portable elevating devices.

In hunting, photographing, or watching deer, bear, turkey, or other wildlife, an elevated position offers many advantages. First, being located above the normal sight lines allows the sportsman to be above the keen eye of the wildlife to thus prevent the wildlife from being spooked. Further, this allows the sportsman to have a vantage point for better and broader observation into the brush and other wildlife habitat. Secondly, the scent of the sportsman will be carried above and beyond the keen sense of smell of the wildlife to thus prevent the wildlife from being spooked from that reason also. Thirdly, it is also safer to be at elevated positions since bullets, arrows, and the like have less tendency to ricochet and will travel less distance if shot down toward the ground than if shot in a standing position. Additionally, the sportsman is not in the line of fire of other sportsmen.

Thus, the use of stands, scaffolds, and the like are preferred by many sportsmen. Additionally, portable devices are particularly preferred since built-in platforms are not allowed in many areas and must naturally remain at the same location. Further, portable devices which can be carried by the sportsman are specifically preferred since they can be utilized deep in the woods and other habitat far from motor vehicle accessibility.

However, prior portable elevating devices had severe deficiencies. Many prior portable elevating devices required excessive physical strength and energy to use. For example, many required the sportsman to hug the tree and raise a stand attached to the sportman's feet. Further, many required that the tree have no limbs to the desired height. Likewise, many could not be utilized to climb utility poles, slippery barked trees, and the like. Thus, a need has arisen for a portable elevating device which overcomes these deficiencies.

SUMMARY

The present invention solves these and other needs by providing an elevating device including a winch mounted to a winch frame. The operator is supported by the winch frame. The free end of the cable can then be secured to an elevated position and the operator can raise and lower himself by rolling or unrolling the cable on the winch.

In the preferred embodiment of the present invention, a flaccid, flexible member and a releasable gripping member on the winch frame are further provided. The gripping member has a first condition for not engaging with the flexible member and a second condition for engaging with the flexible member. The condition of the gripping member is dependent on whether or not the cable of the winch is tight. Thus, the gripping member and flexible member act as a safety line.

In the preferred embodiment of the present invention, the winch includes a member rotatable therewith for stopping rotation of the winch when the rotational speed of the winch reaches a rotational speed limit. Specifically, as the rotational speed of the winch increases, the radial extent of the rotating parts increase until they engage with a stop member located at a radial distance of the desired rotational speed limit.

In the preferred embodiment of the present invention, the device further includes an improved releasably grabbing member. Specifically, a generally C-shaped member is provided for passing around a pole, tree, or like structure for the engaging and gripping thereof.

Furthermore, in the preferred embodiment of the present invention, the grabbing member, the winch frame, and other components are particularly constructed to allow ease of operation and safety and allow its collapse and interconnection into a single unit for a transport mode on the back of the operator.

It is thus an object of the present invention to provide a novel elevating device.

It is further an object of the present invention to provide a novel portable elevating device.

It is further an object of the present invention to provide such a novel elevating device which is safe to use.

It is further an object of the present invention to provide such a novel elevating device which is easy to operate.

It is further an object of the present invention to provide such a novel elevating device which is lightweight and can be easily transported on the back of the operator.

It is further an object of the present invention to provide such a novel elevating device which includes a safety line.

It is further an object of the present invention to provide such a novel elevating device which has provision for preventing descent at an excessive rate.

It is further an object of the present invention to provide such a novel elevating device which includes a novel anchor assembly.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 3 shows a perspective view of the preferred anchor of the device of FIG. 1 in use.

FIG. 4 shows a partial perspective view of the device of FIG. 1 in use.

FIG. 5 shows a cross sectional view of the device of FIG. 1 according to section line 5—5 of FIG. 4.

Figure 1:
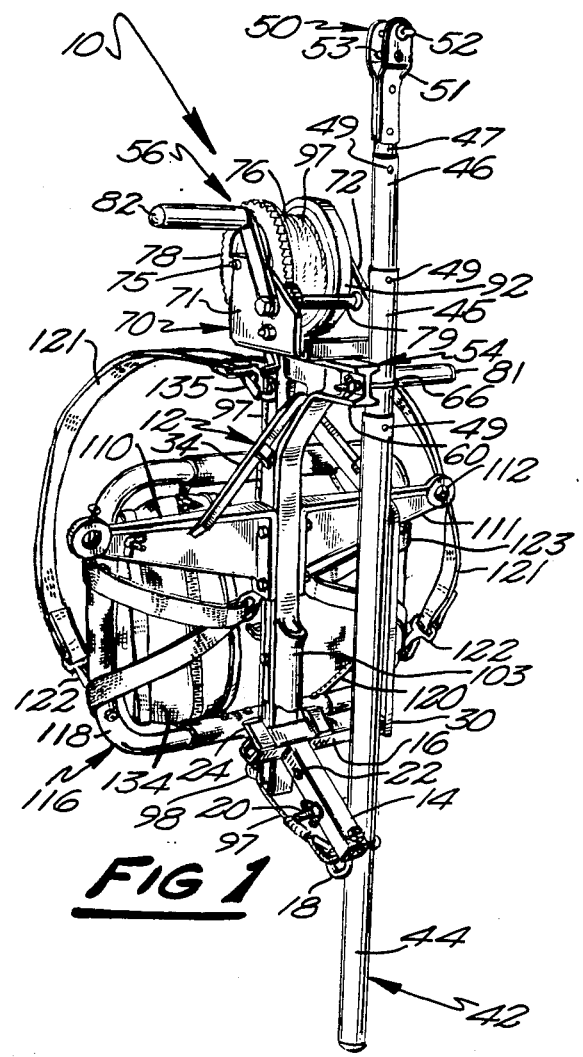
FIG. 1 shows a perspective view of a portable elevating device constructed according to the teachings of the present invention in its transport mode.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms, "top", "bottom", "first", "second", "inside", "outside", and similar terms are used herein, it should be understood that these terms have reference only to the structure shown in the drawings as it would appear to a person viewing the drawings and are utilized only to facilitate describing the invention.

DESCRIPTION

A portable elevating apparatus according to the teachings of the present invention is shown in its most preferred form in the drawings as a portable tree climbing, hunting platform and is generally designated 10. Apparatus 10 generally includes an anchor 12 for securement to a vertical position, and is shown in its most preferred form as a member for releaseable securement to a portion of a tree, pole, or the like. In its most preferred form, anchor 12 includes a first member 14 having its first end connected generally perpendicular to a second member 16. In their most preferred forms, members 14 and 16 are tubular in construction and have square cross sections. The free end of member 14 includes a cable securement device 18. Member 14 further includes a hook member 20 and an aperture 22. Second member 16 further includes spike members 24 and 26 located on opposite sides of but extending away from member 14 for engagement with a tree portion.

Anchor 12 further includes a tree encapsulating member 28 including three integrally connected legs 30, 32, and 34. The first end of leg 30 is connected to an end of member 16 generally perpendicular thereto and in its most preferred form extends at an angle of 125 degrees in relation to the plane defined by members 14 and 16. Leg 32 is connected to the other end of leg 30 and extends therefrom at an angle in the range of 135 degrees and extends generally downwardly from the plane of member 16 and leg 30 by a small angle in the range of 5 degrees. Leg 34 extends generally perpendicularly from the other end of leg 32 and extends generally upwardly from the plane of legs 30 and 32 at a small angle also in the range of 25 degrees. In its most preferred form, the interconnection of legs 32 and 34 is generally in line with member 14. In the preferred embodiment, legs 32 and 34 also include spike members 36. Anchor 12 further includes in its most preferred form a bracing web 38 extending between member 16 and leg 30 and also includes a hook member 40 extending from web 38. Thus, it should be appreciated that anchor 12 has a generally C-shape formed by members 16 and 28.

Apparatus 10 further includes member 42 for positioning anchor 12 in a vertical position. In its most preferred form, member 42 is shown as a telescopic pole including telescopic sections 44, 45, 46, and 47. It can then be realized that telescopic section 47 can be telescoped within section 46, section 46 can be telescoped within section 45, and section 45 can be telescoped into telescopic section 44 such that pole 42 has a transport length which is slightly larger than the length of telescopic section 44. Pole 42 may include any suitable apparatus for holding telescopic sections 44-47 in their telescoped position, such as spring detents which extend through apertures 49 formed in telescopic sections 44, 45, and 46. Thus, pole 42 can be telescoped to a maximum length generally equal to the combined length of telescopic sections 44-47.

Pole member 42 further includes member 50 for removeable securement to anchor 12. Member 50 is shown in its preferred form as a yoke member 51 attached to the free end of telescopic section 47. Yoke 51 can then be positioned to straddle member 14 and a removeable pin member 52 can be positioned through yoke 51 and aperture 22 of member 14. An abutment pin 53 can further be provided with yoke member 51 for holding pole 42 at the desired angle with respect to member 14 of anchor 12 and for placing a safety line at a vertical position as will be explained hereinafter.

Apparatus 10 further includes a winch frame 54 for the mounting of a winch 56 thereto. In its most preferred form, winch frame 54 is L-shaped and includes an elongated first leg 58 and a second leg 60 attached generally perpendicular thereto. A bracing web 62 is further provided between legs 58 and 60 and forms an aperture 64 defined by and between web 62 and legs 58 and 60 of frame 54. Located adjacent to the free end of leg 60 are a hook member 66 and an aperture 68 extending generally parallel to but spaced from leg 58.

Winch 56 generally includes a U-shaped mount 70 having first and second legs 71 and 72 extending from the opposite sides of a central portion 73. In its most preferred form, winch 56 is secured to leg 60 of winch frame 54 by bolts 74 extending through central portion 73 for threaded securement to leg 60 of winch frame 54. Pivotally mounted between legs 71 and 72 is a shaft 75. A cable drum 76 is further provided for rotation with shaft 75. A gear 78 is further secured to shaft 75 on one side of drum 76. A second shaft 79 is also pivotally mounted between legs 71 and 72 in a spaced, parallel relation to shaft 75. Shaft 79 includes a gear 80 in gearing relation with gear 78 of shaft 75. Crank handle members 81 and 82 are further mounted on the opposite ends of shaft 79 allowing manual rotation of shaft 79. A ratchet lever 96 is pivotally mounted to mount 70 and moveable between a first position for engaging with gear 80 preventing rotation of shaft 79 in a direction allowing cable 97 to unroll from drum 76 and a second position allowing rotation of shaft 79.

Winch 56 further includes member 83 for stopping rotation of shaft 75 if the rotational speed of shaft 75 reaches a predetermined limit. Member 83 is shown in its preferred form as including a first plate 84 secured generally perpendicular to and for rotation with shaft 75. First and second members 85 and 86 are pivotally mounted on opposite ends of plate 84 about pivot axes which are generally parallel to but spaced from shaft 75. Member 83 further includes first and second springs 87 and 88 extending between the first end of member 85 and the second end of member 86 and between the second end of member 85 and the first end of member 86 and located on opposite sides of shaft 75. The radially outwardly located corners 89 of first ends of members 85 and 86 and the radially outwardly located corners 90 of the second ends of members 85 and 86 are removed. Member 83 further includes a stop member 91.

Due to the pivot mounting of members 85 and 86 to rotating plate 84 and the bias of springs 87 and 88, the radial extent of members 85 and 86 from shaft 75 increases with the increasing rotational speed of shaft 75 and cable drum 76 mounted thereon due to the centrifugal forces created. Stop member 91 is located at the radial distance from shaft 75 equal to the radial extent of members 85 and 86 at the desired predetermined rotational speed limit desired. Thus, if the rotational speed of shaft 75 is less than the predetermined rotational speed, the radial extend of members 85 and 86 from shaft 75 will be less than the radial distance of stop member 91 from shaft 75 such that members 85 and 86 will not abut with stop member 91 and members 85 and 86 and plate 84 are free to rotate. However, if the rotational speed of shaft 75 is greater than or equal to the predetermined rotational speed limit, the radial extent of members 85 and 86 from shaft 75 is greater than or equal to the radial distance of stop member 91 from shaft 75 such that the first ends of members 85 and 86 will abut with member 91 and prevent further rotation of plate 84 and shaft 75.

In its most preferred form, winch 56 further includes a circular shaped cover 92 pivotally mounted on leg 72 of mount 70 and rotatable with respect to shaft 75, drum 76, gear 78, and member 83. Cover 92 includes a wedge-shaped opening 93. Cover 92 is then pivotal between a first position where wedge-shaped opening 93 is located beneath leg 72 of mount 70 such that cover 92 and leg 72 provide a sealed end dust cover for member 83, and a second position where wedge-shaped opening 93 is located beyond leg 72 such that member 83 can be visually inspected, maintained, and repaired, if required. Cover 92 can then include suitable locking mechanism such as a spring detent 94 mounted on cover 92 for engaging and locking within aperture 95 of leg 72 of mount 70.

A suitable flaccid, flexible pulling member 97 shown in its most preferred form as a cable 97 is then provided having its end anchored to winch 56 for wrapping on cable drum 76 and having is second, free end secured to the cable securement device 18 of anchor 12. The free end of leg 58 of winch frame 54 includes a suitable cable guide 98. In its most preferred form, winch 56 is mounted to winch frame 54 such that cable 97 extends between cable drum 76 and cable guide 98 generally parallel to leg 58 of winch frame 54.

Apparatus 10 further includes a flaccid, flexible pulling member 100 shown in its most preferred form as a rope. Rope 100 includes a suitable device for securing rope 100 in an elevated position. For example, rope 100 can include a suitable clasp member 101 for securement to cable securement device 18, or more preferable, for securement at another location such as being looped around a second attachment position separate from and spaced from cable securement device 18 and/or anchor 12. Apparatus 10 further includes member 102 for releasably grabbing or gripping rope 100. In its most preferred form, member 102 includes a rope receiving and capturing tunnel 103 secured to leg 58 of winch frame 54. Member 102 further includes a gripping member 104 pivotally mounted to leg 58 of winch frame 54. Gripping member 104 in its most preferred form includes rope engaging teeth 105. Gripping member 104 is pivotal between a first rope gripping position or condition as shown in solid in FIG. 6 and a second, non-rope gripping position or condition as shown in phantom in FIG. 6. Specifically, in the first position, gripping member 104 is positioned such that teeth 105 frictionally engage, grip into, and capture rope 100 within and between tunnel 103 and teeth 105 of gripping member 104. In its second position, teeth 105 do not engage with rope 100 and rope 100 is free to pass through tunnel 103. Gripping member 104 is biased into its first position by a torsion spring 106. For moving gripping member 104 into its second, non-gripping rope position, member 104 includes a yoke member 107 for receipt of cable 97. In its most preferred form, yoke 107 includes an idler cylinder 108 rotatably mounted between yoke 107 against which cable 97 can pass to thus present a rolling surface to cable 97 and reduce wear thereto.

Figure 6:
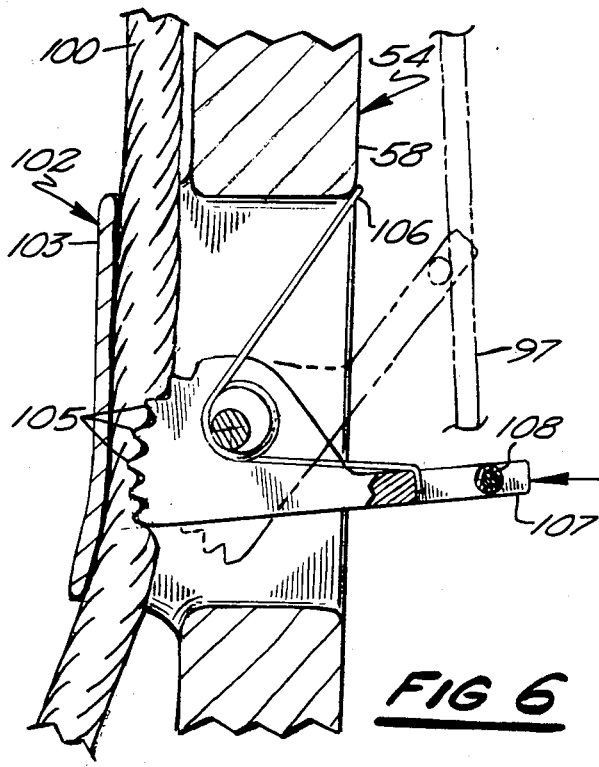
FIG. 6 shows a cross sectional view of the device of FIG. 1 according to section line 6—6 of FIG. 4.
Figure 2:
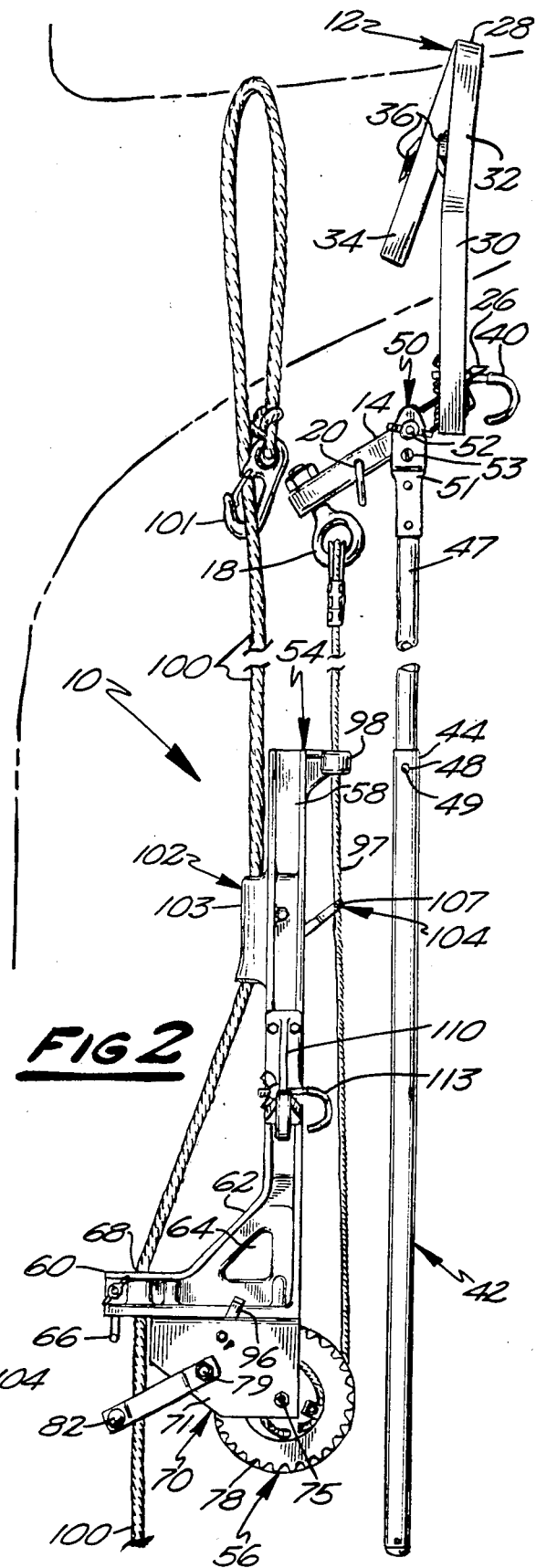
FIG. 2 shows a side view of the device of FIG. 1 in its elevating mode with portions of the device being removed.

If cable 97 is tight between cable securement device 18, guide 98, and drum 76 of winch 56 as best seen in FIG. 2, gripping member 104 is held in its second, non-gripping rope position shown in phantom in FIG. 6. However, if cable 97 becomes loose between cable guide 98 and winch 56, gripping member 104 will pivot under bias of spring 106 to its first, rope gripping position for thus capturing, gripping, and holding rope 100 between tunnel 103 and teeth 105 of gripping member 104 shown in solid in FIG. 6. In its most preferred form, the second end of rope 100 passes through aperture 68 of leg 60 of frame 54 such that rope 100 does not become entangled in crank handles 81 and 82, winch 56, or cable 97.

In its most preferred form, winch frame 54 further includes first and second arms 110 and 111 which extend generally perpendicular to leg 58 of winch frame 54 in a plane generally perpendicular to leg 60 of winch frame 54. Apertures 112 are further formed on the free ends of arms 110 and 112. Arm 110 further includes a hook member 113 located adjacent to aperture 112.

Apparatus 10 further include a harness assembly 114 for the support of an operator therein. In its most preferred form, assembly 114 includes a seat portion 116 including a rectangular tubular frame 118 and a canvas, cloth, or similar member 120 thereon. A foot rest can further be formed by a strap 121 releasably secured to frame 118 of seat 116 by clasps 122 located on opposite ends thereof. Located on opposite sides of seat 116 are seat supports 123 shown in their preferred form as including first and second straps having their first ends connected to frame 118 of seat 116 at spaced locations and having their second ends connected to a suitable clasp member 124.

Harness assembly 114 further includes in its preferred form ring members 125 and 126. A first adjustable strap 127 has its first end secured to ring 125 and has its second end removably secured to aperture 112 of arm 110 by clasp 128. Harness assembly 114 further includes in the preferred embodiment a second adjustable strap 129 having its first end attached to to ring 126 and its second end removeably secured to aperture 112 of arm 111 by clasp 130. Harness assembly 114 further includes an adjustable back strap 131 having its opposite ends attached to rings 125 and 126, respectively. Harness assembly 114 further includes in the preferred embodiment a front strap 132 having its first end secured to ring 125 and having its second end removeably secured to ring 126 by clasp 133. Clasp 124 of seat supports 123 can be removeably secured to rings 125 and 126.

In its most preferred form, apparatus 10 further includes a zippered pouch member 134 secured to canvas 120 of seat 116 for storage of components of apparatus 10 in its transport mode. In the preferred embodiment, strap 121 can further include a clasp 135 intermediate its ends.

Now that the construction of the present invention has been set forth, the operation and subtle features of the present invention can be set forth and appreciated. For the sake of example, it will be assumed that apparatus 10 is not in its transport mode or condition as shown in FIG. 1 but is in its operative condition as shown in FIG. 4. Initially, telescopic sections 44-47 are telescoped such that pole 42 has sufficient length allowing the operator to reach the desired vertical position for anchor 12. At that time, rope 100 may be positioned to the desired vertical position by any suitable methods. For example, due to the weight of clasp 101, the end of rope 100 including clasp 101 can be thrown over a suitable anchoring position such as a limb of a tree as shown in FIG. 2 and clasp 101 placed on rope 100. Similarly, pole 42 can be utilized in the placement and securement of rope 100 by removing pin 52, placing rope 100 on pin 53, reinserting pin 52 to prevent clasp 101 from being pulled therethrough, and after positioning yoke 51 at the desired vertical position feeding rope 100 through yoke 51. At that time, pole 42 may be attached to member 16 of anchor 12 utilizing member 50. Specifically, in its most preferred form, pin 52 may be inserted through yoke 51 and aperture 22 for securing yoke 51 of member 42 to member 14 of anchor 12.

Sufficient cable 97 may then be unwound from cable drum 76 of winch 56. This can be accomplished by releasing lever 96 from engagement with gear 80 of shaft 79. At that time, handles 81 and 82 may be rotated thus rotating cable drum 76 to release cable 97 wound thereon. After cable 97 is unwound, anchor 12 may be placed at the desired vertical position by utilizing pole 42. Specifically, anchor 12 may be positioned on a horizontal limb as shown in FIG. 2. Preferably, anchor 12 may be positioned at a vertical portion of a tree, pole, or the like as best seen in FIG. 3. Specifically, anchor 12 may be positioned such that the vertical portion passes through the opening of anchor 12 defined by the free end of member 16 and the free end of leg 34 of member 28 and is positioned between member 16 and legs 32 and 34 of member 28. It can then be appreciated that by manipulating pole 42, anchor 12 will automatically center itself and cant on the vertical portion such that member 16 and legs 32 and 34 abut with the outside surface of the vertical portion for releasably gripping the vertical portion within anchor 12. It should then be appreciated that spike members 24, 26, and 36 engage with the outside surface of the vertical portion in a non-sliding type engagement.

Since cable 97 is not tight at this stage, it is then necessary to manually grasp yoke 107 and move gripping member 104 to its second non-rope engaging position as shown in phantom in FIG. 6. Rope 100 may then be inserted into and through tunnel 103 and into and through aperture 68 of arm 60 of winch frame 54. Handles 81 and 82 may then be cranked winding cable 97 upon cable drum 76 until winch frame 54 and harness assembly 114 is supported by cable 97.

The operator may then position himself within the harness assembly 114 by removing clasp 133 from ring 126 and sitting upon seat 116. Strap 132 can be placed around the operator and clasp 133 can be buckled to ring 126. If desired, the feet of the operator can also be positioned to rest upon strap 121 as shown in FIG. 4.

After the operator is located in assembly 114, handles 81 and 82 may be cranked rotating shaft 79 and thus rotating gears 80 and 78, shaft 75, and cable drum 76 mounted thereon. It can then be appreciated that as cable 97 is being wound upon cable drum 76, winch frame 54 and harness assembly 114 will then be raised vertically. After the operator is located in the harness assembly 114 and at least partial weight is placed thereon, cable 97 will then be stretched tight, moving gripping member 104 to its second, non-rope engaging position. Therefore, rope 100 simply passes through tunnel member 103 and aperture 68 as cable 97 is being wound on drum 76.

The operator can then raise himself to the desired position by continuing to crank handles 81 and 82 until the desired position is reached. When the operator reaches the desired position, due to the spring biasing of lever 96, ratchet lever 96 engages with gear 80 to thus prevent rotation of gear 78 and thus shaft 75 and cable drum 76. For purposes of preventing the operator from swinging or turning about cable 97 and rope 100 in the vertical position, the operator can place his feet against the trunk or limb of the tree and/or pole 42 can be held by one of the hands of the operator.

When the operator desires to descend from the vertical position, it is first necessary to release lever 96 such that shaft 79 can be rotated in the opposite direction by turning handles 81 and 82. It can then be appreciated that as the operator descends, gravity tends to accelerate the descent. Thus, it is necessary for the operator to slow his descent by grasping handles 81 and 82. However, if for any reason the speed of descent exceeds the predetermined speed of member 83, the first ends of members 85 and 86 will abut with stop 91 as shown in phantom in FIG. 5 and thereby stop rotation of shaft 75 and thus cable drum 76. Thus, member 83 automatically prevents a descent at an excessive speed. In order to release member 83, it is then necessary for handles 81 and 82 to be cranked sufficiently wrapping cable on cable drum 76 such that weight is taken off from member 83. When there is no weight on member 83, members 85 and 86 will withdraw from its abutting position under the bias of springs 87 and 88, again allowing descent by the operator.

It should then be appreciated that if cable 97 should fail for any reason, such as but not limited to breakage of cable 97, breakage or slippage of anchor 12, breakage of the limb or other anchor support to which anchor 12 is releaseably attached, or like failure, cable 97 will become loose between cable drum 76 of winch 56 and cable guide 98. At that time, gripping member 104 moves to its first, rope engaging position as shown in solid in FIG. 6 under the bias of spring 106. Therefore, rope 100 is firmly held in tunnel 103 by gripping member 104. Thus, rope 100 acts as a safety device in stopping the descent of winch frame 54, harness assembly 114, and the operator located therein.

After the operator is again on the ground, it can then be appreciated that anchor 12 can be removed from the vertical anchor support position utilizing pole 42 and that rope 100 can also be removed such as by using pole 42.

Apparatus 10 of the present invention may then be assembled in a transport mode or condition for carrying in a back pack type position such that the arms of the operator are free for other purposes. When it is desired to transport apparatus 10, strap 121 can be removed from seat 116 by unhooking clasps 122. Furthermore, clasps 124 may be unhooked from rings 125 and 126 and clasps 128 and 130 may be removed from apertures 112 of arms 110 and 111. At that time, straps 127, 129, 131, 132, rings 125 and 126, clasps 128, 130, and 133 and rope 100 and clasp 101 attached thereto may be positioned within zippered pouch 134 of seat 116. To prevent straps 123 from hanging loose and possibly catching on objects, clasps 124 thereof can be hooked together such that seat supports 123 are positioned on the back side of 116 overlying pouch member 134.

Frame member 54 can then be positioned upon the back side of seat 116 such that cable drum 76 and cable guide 98 rest upon seat 116 with leg 60 being located in a vertically upward position. The free end of leg 34 may be inserted into and through aperture 64 of frame member 54 until tree encapsulating member 28 extends through aperture 64 to the intersection of legs 32 and 34. Member 16 of anchor 12 may be positioned to abut with the free end of member 58 such that spike members 24 and 26 are located on opposite sides of leg 58. Cable 97 may then be tightened by cranking handles 81 and 82 and thus rotating cable drum 76.

Hook 40 of anchor 12 located in frame member 54 may then be hooked with frame 118 of seat 116. Hook 113 of winch frame 54 may also be hooked with frame 118 of seat 116 and tightened thereon. Due to the preferred constructions of the components of apparatus 10, as hook member 113 is being tightened, anchor 12, frame 54, and seat 116 interconnect with each other in a collapsed condition to form a single unit. Pole 42 which has been telescoped to its shortened length may then be secured by hook member 66 of winch frame 54 and by hook member 20 of anchor 12. Thus, apparatus 10 is in a one piece, compact, transport condition. In its most preferred form, clasp 135 of strap 121 may be attached to cable 97 and clasps 122 of strap 121 may be secured to opposite sides of frame 118 of seat 116 to create a back pack type of arrangement for the carrying of apparatus 10 on the back of the operator. Thus, apparatus 10 can be easily transported for long distances, while the hands of the operator are free for carrying other items such as fire arms and the like.

It should be appreciated that less physical energy is required in utilizing apparatus 10 of the present invention than many other devices utilized for climbing trees and the like. Specifically, due the ratio of gears 78 and 80 and the leverage obtained by handles 81 and 82, the operator can easily winch himself in vertical positions. Furthermore, obstructions such as low limbs on a tree do not pose significant problems to apparatus 10 according to the present invention as they did for prior portable elevating devices. Furthermore, the present invention incorporates many safety devices which operate at all times. Prior to the present invention, many of the safety features could not be utilized during elevation or descent, but could only be utilized when a stationary position was achieved.

It should also be appreciated that anchor 12 has many advantages. First, anchor 12 of the preferred form has no moving parts which are prone to wear and breakage. Due to the preferred construction of anchor 12, anchor 12 automatically centers itself and the weight of pole 42 alone is sufficient to hold anchor 12 firmly on the tree or pole. Additionally, as more weight is placed on anchor 12, anchor 12 more firmly grips the tree or pole. Furthermore, the preferred construction of anchor 12 and other components of apparatus 10 lends to the fast, easy, collapsing ability for the transport mode of the present invention.

Now that the basic teachings of the present invention have been explained, many extensions and variations will be obvious to one having ordinary skill in the art. For example, although apparatus 10 is illustrated in its most preferred form as a portable, hunting tree stand, apparatus 10 can be utilized in other environments and for other purposes. For example, apparatus 10 can be utilized for climbing telephone, electric, and other types of utility poles. Likewise, apparatus 10 can be utilized when it is desired to descend to a lower position such as in the case of caves and the like, or to ascend or descend the sides of buildings, large storage tanks, and the like.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A portable elevating device comprising, in combination: means for releasably grabbing a pole, a tree, or the like at an elevated vertical position; a telescoping pole for removeable interconnection to the releasably grabbing means for positioning the releasably grabbing means at the elevated vertical position; a winch for rolling and unrolling a length of cable on a winch drum having a perimeter, with the feed end of the cable being secured to the releasably grabbing means; a winch frame, with the winch frame comprising, in combination: a single elongated leg having an upper end and a lower end, and first and second arms extending generally perpendicular to and on opposite sides of the single elongated leg adjacent to the lower end of the single elongated leg, with the first and second arms having free ends; with the winch being mounted on the single elongated leg of the winch frame at its lower end and below the first and second arms; means for guiding the cable from the winch, with the guiding means mounted on the single elongated leg of the winch frame adjacent to its upper end and extending from the single elongated leg in a direction perpendicular to the first and second arms, with the perimeter of the winch drum extending beyond the single elongated leg in the same direction as the guiding means for extending the cable between the winch drum and the guiding means in a spaced, parallel relationship to the single elongated leg of the winch frame; and means secured to the winch frame for supporting an operator comprising, in combination: a harness assembly, with the harness assembly including a seat having at least a substantially rigid periphery for allowing the operator to sit thereon, and means for suspending the rigid periphery seat from the free ends of the first and second arms for sole support thereby, with the suspending means comprising first and second straps having first ends removably interconnected to the free ends of the first and second arms of the winch frame and having second ends operatively interconnected to the rigid periphery seat, with the releasably grabbing means, the telescoping pole, the winch, the winch frame, and the operator supporting means being collapsible and interconnectable into a transport condition for carrying on the back of the operator, and wherein the operator can elevate or descend himself while located in the operator supporting means by rolling or unrolling the cable on the winch after the releasably grabbing means is positioned at the elevated vertical position.

2. Portable elevating device comprising, in combination: means for releasably grabbing a pole, a tree, or the like at an elevated vertical position; a telescoping pole for removeable interconnection to the releasably grabbing means for positioning the releasably grabbing means at the elevated vertical position; a winch for rolling and unrolling a length of cable on a winch drum having a perimeter, with the free end of the cable being secured to the releasably grabbing means; a winch frame, with the winch frame comprising, in combination: as single elongated leg having an upper end and a lower end, and first and second arms extending generally perpendicular to and on opposite sides of the single elongated leg adjacent to the lower end of the single elongated leg, with the first and second arms having free ends; with the winch being mounted on the single elongated leg of the winch frame at its lower end and below the first and second arms; means for guiding the cable from the winch, with the guiding means mounted on the single elongated leg of the winch frame adjacent to its upper end and extending from the single elongated leg in a direction perpendicular to the first and second arms, with the perimeter of the winch drum extending beyond the single elongated leg in the same direction as the guiding means for extending the cable between the winch drum and the guiding means in a spaced, parallel relationship to the single elongated leg of the winch frame; means for supporting an operator; first means for suspending the operator supporting means from the free end of the first arm of winch frame; and second means for suspending the operator supporting means from the free end of the second arm of the winch frame, with the operator supporting means being supported solely by the first and second suspending means, and wherein the operator can elevate or descend himself while located in the operator supporting means by rolling or unrolling the cable on the winch after the releasably grabbing means is positioned at the elevated vertical position.

* * * * *